Sept. 10, 1935.    R. O. PICKIN    2,013,839
ROLLER DRILLING BIT
Filed Jan. 16, 1933

INVENTOR.
Rowland O. Pickin

Patented Sept. 10, 1935

2,013,839

UNITED STATES PATENT OFFICE 2,013,839

ROLLER DRILLING BIT

Rowland O. Pickin, Los Angeles, Calif.

Application January 16, 1933, Serial No. 651,912

10 Claims. (Cl. 255—71)

The objects of my improvements are, first, to provide a more efficient bit for cutting through varied formations; second, to provide a more efficient means for mounting the cutter upon the head; third, to afford facilities for removing the cutter from the head; fourth, to provide means for protecting the head from wear; fifth, to afford means for preventing the cuttings from clogging up the bit in cutting through sticky formations.

I attain these objects by mechanism illustrated in the accompanying drawing, in which:—

Figure 2:
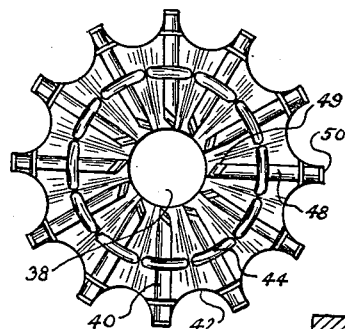
Figure 1:
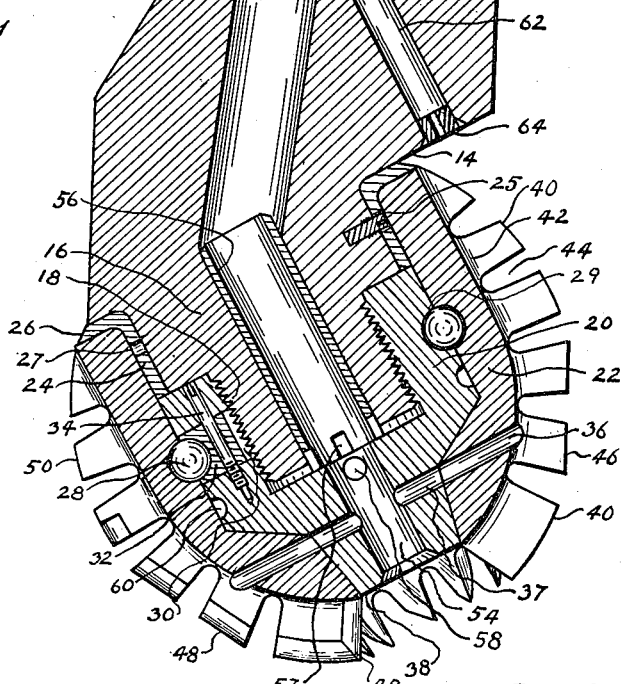

Fig. 1 is a vertical section of the entire drilling bit;

Fig. 2, a bottom view of the cutter; and

Figure 3:
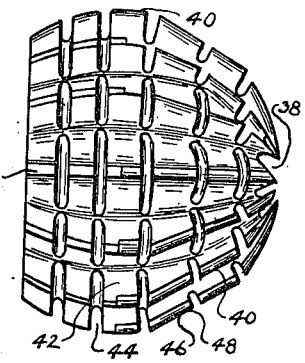

Fig. 3, a side view of the cutter.

Similar numerals refer to similar parts throughout the several views.

The numeral 10 indicates the head, the upper end of which is provided with a threaded pin 12, for the purpose of connecting the tool to the drilling mechanism (not shown). This pin is central with the axis of the tool. The lower end of the head is provided with a face 14 inclined to the axis of the head, and has the pin 16 projecting downwardly at a right angle to the face 14, the axis of the pin 16 intersecting the axis of the head within the tool. The lower end 18 of the pin 16 is reduced in diameter and is threaded upon its exterior for the purpose of securing the internally threaded bushing 20 thereto.

The cutter 22 is rotatably mounted upon the pin 16, and has the bushing 20 and the flanged sleeve 24 interposed between the cutter 22 and the pin 16 in order to prevent wear upon the pin and the face 14 of the head upon which the sleeve is shouldered. The flanged sleeve 24 is prevented from rotating upon the pin 16 by a dowel pin or screw 25. The flange 26 forms a bearing for the top of the cutter, and has holes 27 provided so that its position may be changed when worn.

The interiorly threaded bushing 20 is shouldered upon the larger cylindrical portion of the pin 16 and upon the bottom of the sleeve 24. The top exterior portion of the bushing is cylindrical, the lower portion is tapered.

Before assembling the cutter upon the head, the balls 28 are inserted into the annular race 29 formed partly in the bushing and partly in the cutter through the cylindrical hole 30 formed in one side of the bushing. The cylindrical plug 32 having a ball groove extending across its outer face is then inserted into the cylindrical hole and is secured in place by the pin 34 extending from the top of the bearing through the plug and is secured into the bearing below the plug. The cutter 22 and the bushing 20 then become an assembled unit. The cutter does not enclose the end of the bushing, and a hole 36 is formed which passes transversely through the lower end of the cutter and into the hole 37 in the bushing, a pin (not shown) may then be inserted into the holes thus formed to lock the cutter temporarily against rotation upon the bushing, then the bushing, upon which the cutter is mounted, may be screwed upon the threaded pin 18. When the pin (not shown) is removed, the cutter is free to rotate upon the bushing. The balls rotatably lock the cutter upon the bushing until they are removed by the reverse operation.

Several holes 36 may be formed in the cutter to connect with the hole 37 in the bushing, then, as the cutter rotates and these holes come into line with each other the intermittent force of the fluid passing through the holes will dislodge the cuttings from between the rows of teeth 40.

The upper interior portion of the cutter 22 is cylindrical and has a ball groove near the bottom, the lower end is tapered to conform with the bushing 20, and has a central aperture 38 through the bottom. The teeth 40 radiate towards this bottom opening and towards the opening at the top of the cutter and are generally spherical in contour and cut upon diametrically opposite sides of the borehole simultaneously. The teeth are formed by grooves 42, notches 44 and are irregular and shortened, as shown at 46 for the purpose of allowing the freer circulation of the cuttings. It will be manifest that it is not necessary to have the teeth or the rows of teeth symmetrical or of the same length.

The teeth that are below the intersection of the tool and cutter axis at a right angle to the cutter axis are bevelled to a sharp edge 48, the cutting faces 49 are also bevelled. The teeth that are above that line have a broad edge 50. All the teeth have pieces of abrasive built into their cutting edges or faces by a welding process and these pieces of abrasive act as the main cutting elements in the broad faces 50, these cutting faces having greater width on this portion of the cutter, cover a greater area of the surface of the borehole when these teeth are in contact at the angle at which the cutter is offset, and so scrape and cut away the material of the borehole left between the depressions formed by the teeth at a right angle to that line of contact.

Flushing out and lubricating means are provided by the duct 52 through the head 10 leading to the central duct 54 through the bushing 20 and out through the bottom of the cutter and into the borehole between the teeth of the cutter. A replaceable sleeve 56, provided with vents 57, lines the bottom portion of the duct 52, for the purpose of preventing the flushing out fluid cutting away the pin 16. A branch duct 58 is provided through the bushing 20 and connects with the annular groove 60 circling the bushing, for the purpose of lubricating the cutter bearing.

Another branch duct 62 in the head 10 provides a fluid outlet above the cutter, this duct 62 connects with the duct 52, and has a reduced bushing 64 welded into the outlet in the face 14.

In operation, the head rotates to the right and the cutter rolls and drags with an independent motion as it gyrates upon the independent axis, provided by the bearing, intersecting the main axis of the head. The teeth dig and scrape away the formation and the cuttings are carried out of the borehole by the circulating fluid forced through the tool.

I am aware that prior to my invention roller drilling bits have been made with but a single cutting roller; that a roller cutter has been mounted upon a bushing and secured thereon by a ball lock; that the teeth and flushing out ducts have been similarly arranged; and that embodiments of these features have been shown in Patents Nos. 1,254,267; 1,254,268; 1,334,632 and 1,760,317 issued to me. I therefore do not claim such a combination broadly; but

I claim:

1. A roller drilling bit embodying a head; a pin inclined to the axis of said head and projecting downwardly therefrom; an internally threaded bushing mounted upon said pin; a cutter rotatably mounted upon said bushing, said cutter being of such dimensions that it cuts upon diametrically opposite sides of the borehole simultaneously.

2. A roller drilling bit embodying a head, a pin projecting downwardly from said head at an angle inclined to the axis of said head, said pin having an upper cylindrical portion and a lower externally threaded reduced portion, an internally threaded bushing attached to said threaded portion and shouldered against the bottom of said cylindrical portion, and a cutter rotatably mounted upon said bushing.

3. A roller drilling bit embodying a head having a lower face inclined to the axis of said head, a pin projecting downwardly with its axis at a right angle from said face and integral therewith, said pin having an upper cylindrical portion surrounded by a detachable sleeve and a lower reduced externally threaded portion having an internally threaded bushing attached thereto, said sleeve and said bushing having a cutter rotatably mounted thereon.

4. A roller drilling bit embodying a head having a lower face inclined to the axis of said head, a pin projecting downwardly with its axis at a right angle to said face, said pin having an upper cylindrical portion provided with a detachable outwardly projecting bearing member abutting upon said face, said pin in addition having a lower reduced externally threaded portion upon which an internally threaded bushing is secured, said bushing having a cutter rotatably mounted thereon, said cutter having its upper end bearing upon said outwardly projecting bearing member.

5. A roller drilling bit embodying a head provided at its lower end with a pin having its axis inclined to and intersecting the axis of said head, said pin having external threads upon its lower end; an internally threaded bushing attached to said pin; a cutter rotatably mounted upon said bushing and locked thereon by antifriction locking means inserted into an annular groove formed partly in said cutter and partly in said bushing through a hole in said bushing and secured therein by a plug inserted into said hole, said cutter having an aperture at both ends and being of such dimensions that it cuts upon diametrically opposite sides of the borehole simultaneously.

6. A roller drilling bit embodying a head provided with a pin at its lower end having its axis inclined to and intersecting the axis of said head and having a fluid duct there-through, the fluid duct being central in passing through the pin; a bushing mounted upon said pin and having a fluid passage there-through in alignment with said pin duct; a cutter rotatably mounted upon said bushing and having a central opening in the lower end for the escape of the fluid through the cutter.

7. A roller drilling bit, embodying a head provided with a pin projecting downwardly therefrom and having its axis inclined to and intersecting the axis of said head and being provided with a fluid duct there-through, the fluid duct being substantially central with respect to its exit from the pin; a bushing mounted upon said pin and having a substantially central duct there-through, and a substantially transverse duct connecting with said central duct; a cutter rotatably mounted upon said bushing having a transverse duct in intermittent alignment as the cutter rotates upon the bushing for the passage of fluid through the side of said cutter, from the transverse duct in said bushing.

8. A roller drilling bit embodying a head provided with an inclined face upon its lower end and a pin projecting downwardly from said face, said pin being externally threaded and having its axis inclined to and intersecting the axis of the head; an internally threaded bushing mounted upon said pin; a cutter rotatably mounted upon said bushing; said head, pin, bushing and cutter being provided with a fluid duct in alignment there-through; said head duct having a branch duct to conduct fluid into the borehole through said lower end; and a reduced bushing secured into the outlet of said duct by a weld.

9. A roller drilling bit embodying a head provided with an externally threaded pin projecting downwardly and having its axis inclined to and intersecting the axis of said head; an internally threaded bushing mounted upon said pin; a cutter rotatably mounted upon said bushing; connecting fluid ducts through said head, said bushing and said cutter; cutting teeth provided on the outer surface of said cutter; said cutter being substantially spheroidical in form, said cutter being of such dimensions that it cuts upon diametrically opposite sides of the borehole simultaneously.

10. A roller drilling bit embodying a head provided with an externally threaded pin projecting downwardly and having its axis inclined to and intersecting the axis of said head; an internally threaded bushing mounted upon said pin; a cutter rotatably mounted upon said bushing; said cutter having an outer contour substantially spheroidical in form, teeth arranged on the outer surface of said cutter in rows radiating toward the central openings in the top and bottom of said cutter, said cutter being of such dimensions that it cuts upon diametrically opposite sides of the borehole simultaneously.

ROWLAND O. PICKIN.